(12) United States Patent
Lutz

(10) Patent No.: US 6,249,723 B1
(45) Date of Patent: Jun. 19, 2001

(54) HYBRID VEHICLE AND PROCESS FOR OPERATING A HYBRID VEHICLE

(75) Inventor: Dieter Lutz, Schweinfurt (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/178,997

(22) Filed: Oct. 26, 1998

(30) Foreign Application Priority Data

Oct. 25, 1997 (DE) ............................................. 197 47 265

(51) Int. Cl.[7] .................................................. B60L 11/02
(52) U.S. Cl. .................................................. 701/22; 701/56
(58) Field of Search ................................. 701/22, 56, 65, 701/102, 208; 477/3; 180/65.2

(56) References Cited

U.S. PATENT DOCUMENTS

| | | | |
|---|---|---|---|
| 4,335,429 | * 6/1982 | Kawakatsu | 701/102 |
| 5,815,824 | * 9/1998 | Saga et al. | 701/22 |
| 5,832,396 | * 11/1998 | Moroto et al. | 701/22 |
| 5,892,346 | * 4/1999 | Moroto et al. | 318/587 |

FOREIGN PATENT DOCUMENTS

| | | | |
|---|---|---|---|
| 29 43 554 | 10/1990 | (DE) | B60L/11/18 |
| 43 23 601 A1 | 1/1995 | (DE) | B60K/6/04 |
| 195 23 985 | 1/1996 | (DE) | B60K/41/00 |
| 44 22 636 | 1/1996 | (DE) | B60K/41/00 |
| 196 29 235 | 1/1997 | (DE) | B60K/6/02 |

OTHER PUBLICATIONS

P. Weidenhammer, "Zurück aus der Zukunft", German Publication Mot, 4/1995, p. 82–85.

* cited by examiner

*Primary Examiner*—Gregory C. Issing
(74) *Attorney, Agent, or Firm*—Cohen, Pontani, Lieberman & Pavane

(57) ABSTRACT

A hybrid drive for a vehicle in which the driving power provided by an internal combustion engine (ICE) or an electric motor may be fed via a transmission with a transmission input shaft and a transmission output shaft to the drive train. The ICE and the electric motor are connectable to each other via a coupling and the electric motor is directly connected to the transmission. An electric energy storage device is connected to the ICE for receiving a charge and to the electric motor for providing power to the electric motor. The hybrid drive is designed so that the torque that can be provided by the electric motor is greater than that of the internal combustion engine. In addition, the transmission input shaft always turns in the same direction as the transmission output shaft so that reverse drive by the hybrid drive is only possible using the electric motor.

5 Claims, 3 Drawing Sheets

HYBRID VEHICLE AND PROCESS FOR OPERATING A HYBRID VEHICLE

BACKGROUND OF THE INVENTION

1. Field of the Invention

The invention relates to a vehicle with hybrid drive, in which the driving power provided by an internal combustion engine or an electric motor is fed to the drive train via a transmission with a transmission input shaft and a transmission output shaft. The internal combustion engine and the electric motor are connectable to each other via a coupling. The electric motor is directly connected to the transmission. The vehicle also includes an electric energy storage device for providing power to the electric motor that is chargeable by the internal combustion engine. A process for operating a hybrid vehicle with a satellite-controlled navigation system is also disclosed.

2. Description of the Related Art

A hybrid vehicle of the aforementioned type is known, for example, from references DE 43 23 601 A1 and DE 29 43 554. The reference DE 29 43 554 discloses a hybrid vehicle started by the electric motor alone. The internal combustion engine (ICE) of this prior art vehicle is started only after a minimum speed is attained using the stored kinetic energy of rotating masses between two separating couplings. After being started, the ICE is accelerated very quickly to the speed of the electric motor. During uphill and/or accelerating travel, the electric motor is operated with the ICE, in a known manner, as a simultaneously acting driving engine, and during downhill and/or deceleration phases, the electric motor is operated as a generator to feed an energy storage device.

Another prior art reference DE 44 22 636 A1 discloses a process for the automatic control of an ICE in hybrid vehicles. This prior art control process discloses using one of four operating modes of the ICE depending on the driving state of the vehicle. In a first operating mode, power is provided by the ICE only when a preestablished minimum value of an operating parameter proportional to the vehicle speed is reached. In a second operating mode, power is provided by the ICE when the total power demanded exceeds a short-term power limit. In a third operating mode, power is provided by the ICE delayed by a preestablished time period when the total power demanded exceeds a long-term power limit and falls below a short-term power limit. In a fourth operating mode, when the charge level of the electric energy storage device has dropped to a lower limit, power is provided by the ICE until an upper limit of the charge level is again attained. The ICE is turned on when the power available from the electric motor is no longer sufficient. The long-term power limit is defined in the aforementioned publication as the power that can be delivered permanently by the electric energy storage device.

Yet another control device for a hybrid vehicle is disclosed in prior art reference DE 195 23 985 A1. In this control device, power produced by the driving engine is applied via a generator inverter to an engine/generator, so that the engine/generator drives the ICE to apply a braking force to the latter. In this way, power produced during regenerative braking that cannot be absorbed by a saturated battery (such as during downhill travel) is used to support the braking of the vehicle.

All known hybrid vehicles require a large structural space for the driving unit because the ICE and the electric motor are connected one behind the other with a coupling between them and the transmission is connected to the electric motor. The additional space requirement created by the parallel hybrid drive must be as small as possible. For installation in existing vehicles having a conventional drive unit, a maximum lengthening of 30 mm, compared with the conventional driving unit, is permissible. Otherwise, the structure of the vehicle would have to be modified. Given the low production number of the hybrid vehicles, any required structural modification would lead to a considerably greater expense. Therefore a problem of the prior art hybrid vehicles is to minimize the additional space requirement. In addition, the use of each of the ICE and electric motor must be properly selected to produce the greatest savings in fuel consumption.

SUMMARY OF THE INVENTION

To solve the problems of the prior art, a generic vehicle according to the present invention includes a hybrid drive in which the torque that is provided by the electric motor is greater than the maximum torque of the internal combustion engine. In addition, the transmission input shaft and the transmission output shaft always turn in the same forward rotation direction when driven by the ICE. Reverse travel is possible exclusively via the electric motor.

Instead of low-torque motors, an electric motor with a substantially higher torque than the internal combustion engine is used at low speeds. The axial structural space required by this higher torque electric motor is compensated for by a space-saving transmission, which omits a reverse gear. The forward rotational direction of the transmission input shaft and output shaft can not be changed during operation by the ICE. With the higher torque electric motor, it is possible to start movement of a vehicle using a gear that is normally used as a second gear with conventional motors. Omitting the reverse gear allows the axial structural space of the transmission to be reduced. The additional omission of the conventional first gear leads to a further reduction of the structural space of the transmission. The high torque of the electric motor, which is preferably an external rotor motor, may also be used for applying a braking force to the vehicle.

The ICE and the electric motor are preferably connectable in series so that both the ICE and the electric motor can provide power simultaneously when a driving power required by the vehicle is greater than that which can be provided by one of the ICE and electric motor alone.

Preferably, braking is brought about by switching the electric motor to generator operation. The braking energy may then be taken from the electric storage device as required to brake the vehicle.

When the vehicle is equipped with a satellite-controlled navigation system such as a global positioning system (GPS), operation of the vehicle may be controlled in a pre-planned manner. In an especially advantageous embodiment, the navigation system or a computer arranged with the navigation system includes or receives elevational or topographical data on at least some of the routes within a given region.

A process for operating the above-described vehicle with a GPS according to an embodiment of the invention includes the following steps:

inputting current vehicle parameters including fuel supply and charge level of electric energy storage device and of additional charge into a computer connected to the navigation system;

inputting a desired destination into the computer;

calculating an expected travel time in response to the route topography and assuming the uniform use of the ICE and the electric motor and displaying the calculated expected travel time on a display device;

comparing the expected travel time with a travel time predetermined by the driver and recalculating the expected travel time using different amounts of use of the ICE and the electric motor if required;

adjusting a respective use of the ICE and the electric motor to the route to realize the desired travel time, before starting the trip; and establishing charging cycles for charging the energy storage device by the ICE, along the route excluding the periods of downhill travel by the vehicle.

In designing the hybrid vehicle according to the present invention, it is assumed that from the total quantity of fuel used, for example, 4.6 liter/100 km, given a vehicle weight of 1 ton and 500 kg maximum additional load, the ICE produces approximately 30% mechanical power and 70% waste heat. Regarding the mechanical power produced by the ICE, ⅕ is used for each of overcoming friction, maintaining speed and acceleration, while approximately ¹/₁₀ is used for the auxiliary output. Regarding the waste heat produced by the ICE, 40% is lost as heat in the cooling circuit and must be extracted. Of this lost heat in the cooling circuit, 10% can be used for heating and 30% is discharged in the exhaust gas. Since 10% of the waste heat is useable, the total loss of the mechanical power equals 60%. In a hybrid vehicle, this total loss can be halved, as can 10% of the power used for acceleration. By using a recuperative arrangement in a hybrid vehicle, 50% of the energy wasted by a conventional ICE is recoverable, so that the hybrid vehicle uses approximately 35% less energy than a conventional ICE alone uses. The goal of the hybrid vehicles is to consume, instead of 4.6 liters, only 3 liters per 100 km.

To attain energy savings with a hybrid vehicle with the same total weight as a comparable conventional vehicle, an electric energy storage device that is chargeable by the internal combustion engine should be used, for example. Moreover, electric auxiliary outputs should be designed so as to relieve the internal combustion engine at least at times. Instead of a long-term battery, it is desirable that the electric energy storage device include a fuel cell The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
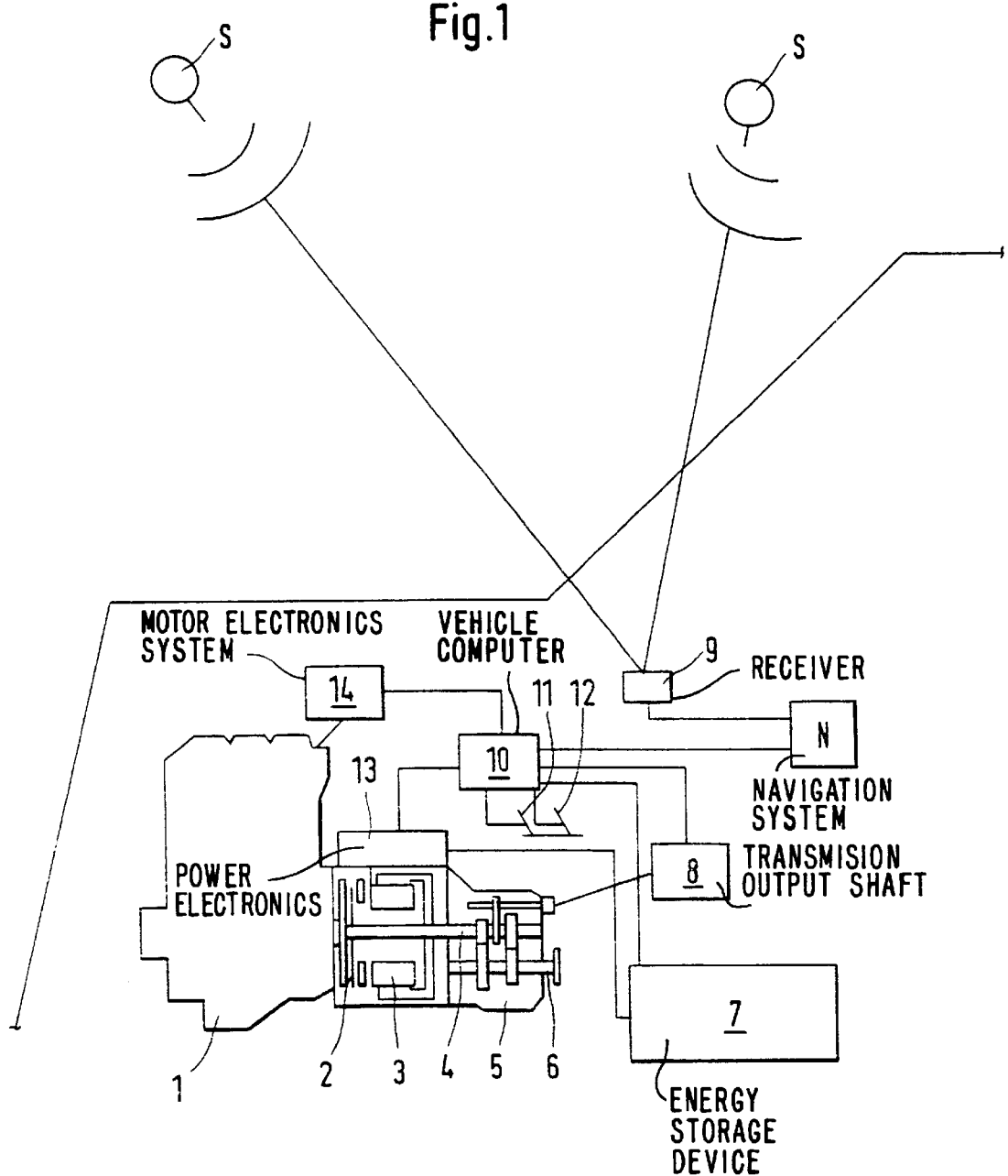
FIG. 1 is a schematic arrangement of a hybrid drive and the necessary control elements according to an embodiment of the present invention.

A hybrid drive according to an embodiment of the present invention includes an internal combustion engine 1 having an average output, an electric motor 3 connected to the internal combustion engine 1 via a coupling 2, and a transmission 5 flanged to the electric motor 3. The transmission 5 includes a transmission input shaft 4 and a transmission output shaft 8. An electric energy storage device 7 is connected via an intermediate connection of a power electronics system 13 to the electric motor 3 for driving the electric motor 3 with low work and high output. A vehicle computer 10 is connected to the power electronics system 13, the electric energy storage device 7, the accelerator pedal 11 and the brake pedal 12, and a motor electronics system 14 for controlling the internal combustion engine 1. The vehicle computer 10 also controls the electric motor 3 via the power electronics system 13. A transmission control 8 is also connected to the computer 10 for controlling the transmission 5. A satellite-controlled navigation system N is also connected to the computer 10. The navigation system N includes a global positioning system (GPS) receiver 9 which receives signals from satellites S located in earth orbit and forwards these signals to the navigation system N or vehicle computer 10, in which road maps of a desired scope (for example, Germany-wide, Europe-wide, worldwide) are stored. The navigation system N or the vehicle computer 10 may also be provided with topographical data corresponding to elevation data for the road maps stored therein.

The internal combustion engine 1 is designed only for the long-term power of the vehicle and does not provide a peak output of the vehicle. The electric energy storage device 7 is designed for high output, but with very low energy such, for example, as ⅕ of the energy used by a conventional electric energy storage device. Its weight in the preferred embodiment is approximately 60 kg. The electric motor 3 is selected as a type with a very high power-to-mass ratio, and preferably comprises an external rotor model, with an output on the magnitude of the internal combustion engine 1 for the additional peak load and with a torque substantially greater than the maximum torque produced by the internal combustion engine 1. The transmission 5 has no reverse gear, so the input shaft 4 always turns in the same direction as the output shaft 6. To optimize gear changes, the transmission 5 is controlled via the transmission electronics system 8. The transmission 5 is always operated in the forward rotational direction when driven by the ICE 1. Because the electric motor 3 may be polarity-reversed, reverse travel is performed exclusively under the power of the electric motor 3. The electric motor 3 is also required to start the vehicle from a fully stopped state. Because the electric motor 3 is designed to have a very high-torque output, the starting gear of the transmission 5 may comprises gear ratios comparable to a conventional second gear in vehicles powered by a conventional ICE. Accordingly, the transmission 5 of the present invention is designed without a reverse gear and without a gear corresponding to the conventional first gear.

When the electric motor 3 is operated as a generator, the electric energy storage device 7 is fed via the power electronics system 13. The electric energy storage device 7 is able to take greater power than needed as a result of the braking energy recovery. This power electronics system 1 allows extremely high efficiency to be attained because upon each braking procedure the energy can be completely recovered by the electric energy storage device 7.

The omission of the first and reverse gears in the transmission 5 of the above design saves approximately 50 mm to 70 mm of structural space in an automobile transmission. The shifting of the automatic mechanical transmission 5 is simplified, because fewer shift positions are needed. Since the ICE 1 and the electric motor 3 may each be individually activated as desired when a greater driving power is required than is available from the ICE 1 or electric motor 3 alone, it is ensured that the vehicle, even in the highest transmission gear, responds to the gas pedal and that smooth acceleration is immediately possible.

Figure 2:
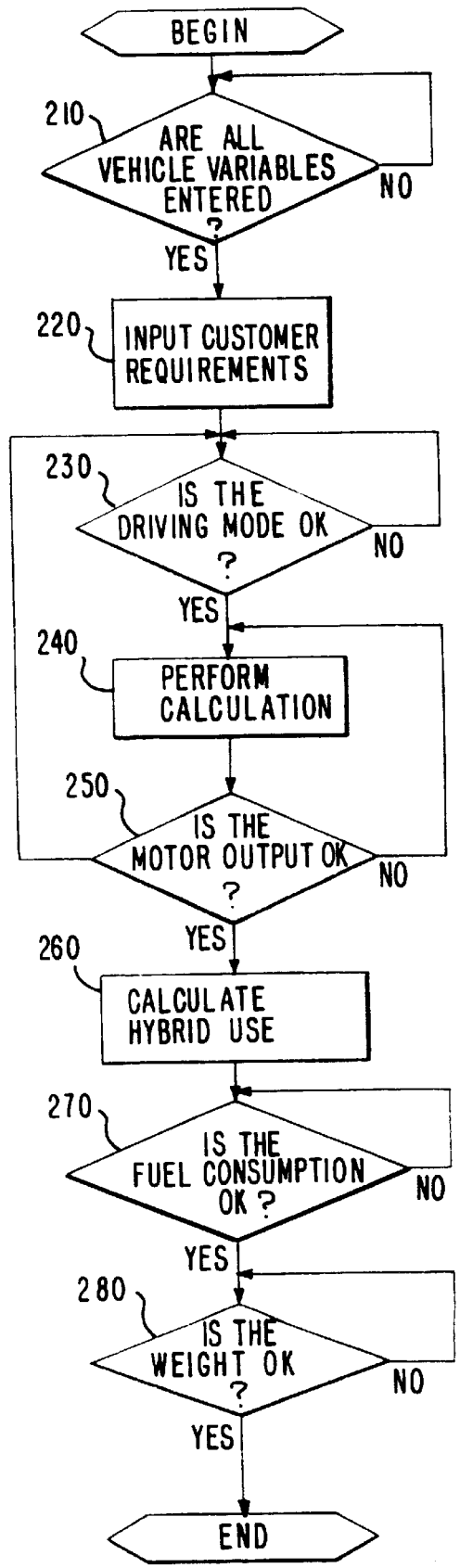
FIG. 2 is a flow diagram for a process of designing a hybrid drive according to the present invention.

When designing the hybrid vehicle, an attempt must be made to realize the lowest possible fuel consumption in keeping with customer requirements. FIG. 2 shows a flow diagram depicting the steps required for properly designing the hybrid vehicle. In the step 210, the designer must determine if all the vehicle variables and/or characteristics are know or entered. If they are not known, the designer must retrieve them or must estimate them based on the intended use of the vehicle. These characteristics may include the current energy consumption of an actual state of the vehicle which comprises the friction of the vehicle relative to the underground, the flow losses at a given speed, the acceleration losses, the other driving losses of the internal combustion engine and the losses due to the auxiliary outputs for steering, air conditioning, lights, etc. In step 220, when designing a vehicle in a defined manner for a customer who wants the lowest possible fuel consumption with appropriate driving performance, it is necessary, in keeping with customer specifications, to consider in advance customer specific characteristics such as the frequency with which the customer will be driving on autobahns, highways, and/or in city traffic, the average speeds that the customer intends to drive, data related to the road conditions such as hills and flat surfaces on which the customer drives, and the maximum speeds the customer wishes to attain. In step 230, the designer determines of the customer intended driving mode is possible with the current setup. In step 240, a calculation is performed to determine the output of the hybrid drive using a default size for the ICE, the electric motor, and the battery. In step 250 it is determined whether the output of the default setup is adequate for the specific customer characteristics. If it is not adequate, different combinations of ICEs, electric motors, and batteries must be used and the calculation of step 240 must be reperformed for the new setup. If it is adequate, the hybrid use of each of the ICE, the electric motor, and the battery is calculated in step 260. In step 270, the designer determines whether the fuel consumption is adequate. If it is not, the amount of hybrid use must be altered. If the fuel consumption is adequate, the designer must lastly evaluate whether the weight of the vehicle is adequate in step 280.

Figure 3:
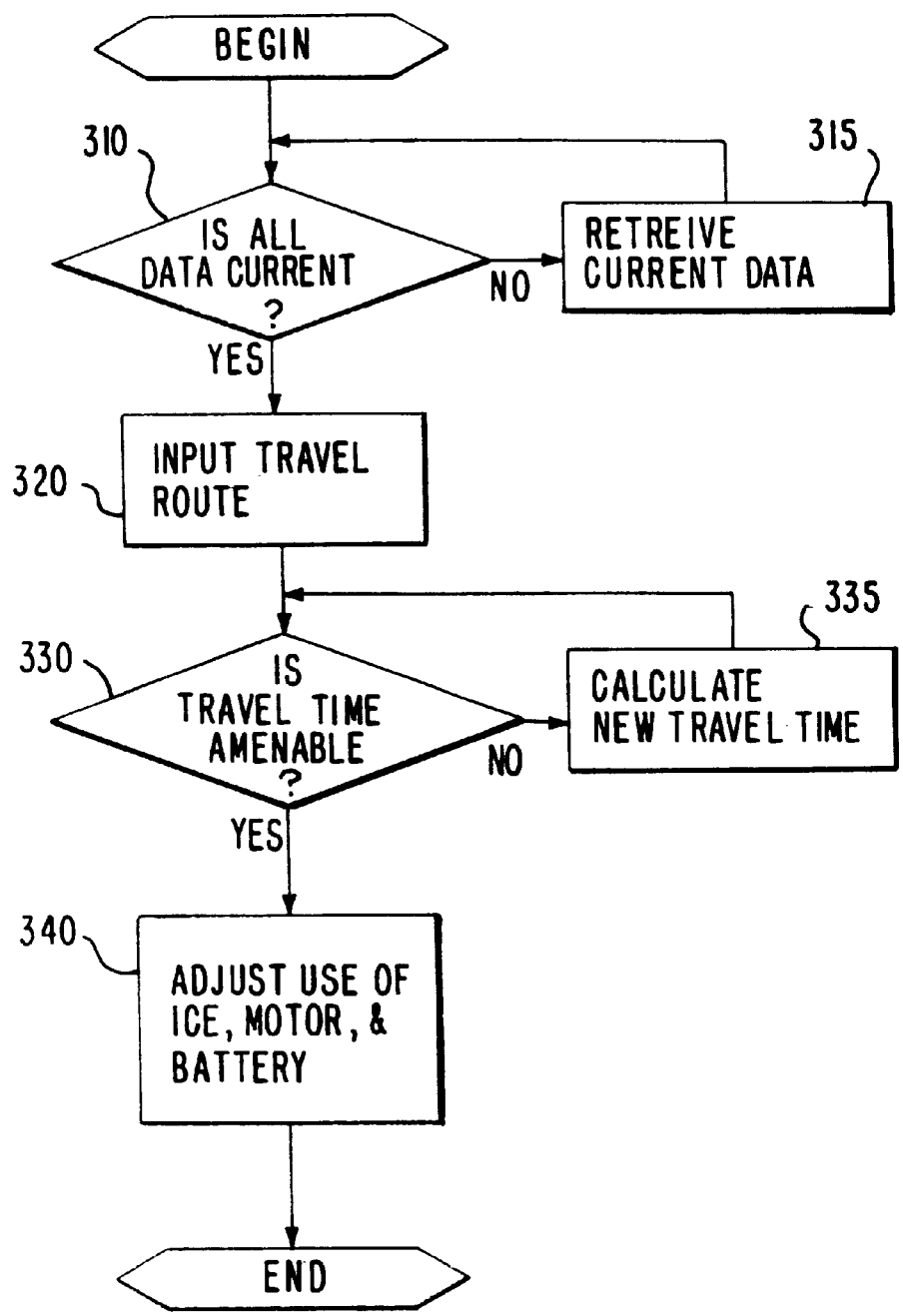
FIG. 3 is a flow diagram for a process of controlling the vehicle operation according to the present invention.

FIG. 3 is a flow diagram showing the use of the designed hybrid vehicle on a specific route. In steps 310 and 315, the computer of the hybrid vehicle determines whether all the vehicle data including the fuel supply and the charge level of the battery electric energy storage device 7 and of the additional charge is current. To optimize energy consumption, the driver enters the current vehicle parameters into the computer 10 connected to the navigation system N at the start of his trip. Using the GPS receiver 9 and the navigation system N, all data about a route predetermined by the driver may be called up in advance. Thus, the precise elevation profile of the route is available. In step 320, the driver then enters his desired destination into the computer 10. In conjunction with the navigation system N including the topographical data, the computer 10 calculates the expected travel time. The calculation is first performed assuming that the electric motor 3 and the internal combustion engine 1 are used roughly to the same extent. If the driver is amenable to this travel time in step 330, these directives are recorded in the computer, and the vehicle is then controlled accordingly. If the driver is not amenable with the travel time, the internal combustion engine 1 is influenced to a greater or lesser extent. That is, the driver chooses a shorter or a longer travel time. If he chooses a shorter travel time, the internal combustion engine 1 is used more, and the electric energy storage device 7 is more strongly charged. If he chooses a longer travel time, the electric motor 3 is used more heavily. If the driver is now satisfied with the travel time calculated, all instructions for the internal combustion engine 1, the electric motor 3 and the charging cycles of the battery 7 are set in accordance with the route in step 340. It must thereby be taken into account that during uphill travel, the internal combustion engine 1 no longer has any reserves to charge the battery 7. The charging cycles must thus be assigned to downhill travel periods and periods when the vehicle is moving constantly on a level surface. In this way, it is guaranteed that minimum fuel consumption is attained with the hybrid vehicle over a given route in a predetermined travel time.

The invention is not limited by the embodiments described above which are presented as examples only but can be modified in various ways within the scope of protection defined by the appended patent claims.

I claim:

1. A hybrid drive for a vehicle, comprising:

transmission including a transmission input shaft and a transmission output shaft operatively connected to said transmission input shaft such that said transmission output shaft always rotates in a same rotational direction as said transmission input shaft;

an electric motor having an output torque and connected to said transmission input shaft for selectively rotating said transmission input shaft in a forward rotational direction and a reverse rotational direction;

an internal combustion engine (ICE) having a maximum output torque selectively connectable via a coupling to said transmission input shaft for rotating said transmission input shaft solely in a forward rotational direction, wherein said output torque of said electric motor is greater than said maximum output torque of said ICE;

an electric storage device selectively connectable for receiving a charge from and supplying electric power to said electric motor; and a controller for controlling said electric storage device and said coupling.

2. The hybrid drive as in claim 1, wherein controller comprises means for connecting said ICE and said electric motor via said coupling when a required driving power is greater than a peak output of said ICE and is greater than a peak output of said electric motor.

3. The hybrid drive as in claim 1, wherein said controller comprises means for switching said electric motor to generator operation and taking energy from said electric storage device for braking the vehicle.

4. The hybrid drive of claim 1, further comprising a connection to vehicle navigation system connected to said controller.

5. The hybrid drive of claim 4, wherein said controller comprising means for receiving navigation system includes topography data.

* * * * *